United States Patent [19]
Mathis

[11] Patent Number: 5,948,043
[45] Date of Patent: Sep. 7, 1999

[54] NAVIGATION SYSTEM USING GPS DATA

[75] Inventor: Darrell L. Mathis, Hillsborough, Calif.

[73] Assignee: Etak, Inc., Menlo Park, Calif.

[21] Appl. No.: 08/747,161

[22] Filed: Nov. 8, 1996

[51] Int. Cl.$^6$ ........................................................ G01S 5/02
[52] U.S. Cl. .......................... 701/208; 701/213; 342/357; 342/457
[58] Field of Search ..................................... 701/207, 208, 701/213, 214, 300; 342/357, 450, 457; 340/988, 990, 995

[56] References Cited

U.S. PATENT DOCUMENTS

| | | |
|---|---|---|
| 3,789,198 | 1/1974 | Henson et al. . |
| 3,845,289 | 10/1974 | French . |
| 4,032,758 | 6/1977 | Lewis . |
| 4,061,995 | 12/1977 | McCrickerd . |
| 4,114,437 | 9/1978 | Krogmann . |
| 4,300,390 | 11/1981 | Shimizu . |
| 4,347,730 | 9/1982 | Fisher et al. . |
| 4,388,608 | 6/1983 | Bernard . |
| 4,403,291 | 9/1983 | Von Tomkewitch . |
| 4,470,119 | 9/1984 | Hasebe et al. . |
| 4,521,777 | 6/1985 | Nakamura et al. . |
| 4,571,684 | 2/1986 | Takanabe et al. . |
| 4,686,642 | 8/1987 | Buxton et al. . |
| 4,734,863 | 3/1988 | Honey et al. . |
| 4,788,645 | 11/1988 | Zavoli et al. . |
| 4,796,191 | 1/1989 | Honey et al. . |
| 4,914,605 | 4/1990 | Loughmiller, Jr. et al. . |
| 5,276,451 | 1/1994 | Odagawa ................................ 342/357 |
| 5,293,318 | 3/1994 | Fukushima ............................. 364/449 |
| 5,311,195 | 5/1994 | Mathis et al. . |

FOREIGN PATENT DOCUMENTS

| | | |
|---|---|---|
| 0 110 171 | 6/1984 | European Pat. Off. . |
| 0 120 487 B1 | 10/1984 | European Pat. Off. . |
| 0 393 935 | 10/1990 | European Pat. Off. . |
| 58-111969 | 7/1983 | Japan . |
| 58-113711 | 7/1983 | Japan . |

OTHER PUBLICATIONS

American Practical Navigator, An Epitome of Navigation, Nathaniel Bowditch, LL.D.(1977 Edition) pp. 1204–1237.

"Electro Gyro–Cator' New Inertial Navigation System for Use in Automobiles," Katsutoshi Tagami, Tsuneo Takahashi and Fumitaka Takahashi, SAE 1983 Transactions, Section 2—vol. 92, published by Society of Automotive Engineers, Inc.

SAE Technical Paper Series, Application of the Compact Disc in Car Information and Navigation Systems, by Martin L.G. Thoone and Ron M.A.M. Breukers (1984).

"Development of an Automatic Vehicle Monitoring System for the City of Dallas," Seymour M. Weinstein, 1977 Carnahan Conference on Crime Countermeasures, Proceedings, Apr. 6–8, 1977.

"Position Location Methods for Road Bound Mobiles by Dead Reckoning with Support of Stored Digital City–Map Information," Frank Sausen (no date).

(List continued on next page.)

Primary Examiner—William A. Cuchlinski, Jr.
Assistant Examiner—Ed Pipala
Attorney, Agent, or Firm—Fliesler, Dubb, Meyer & Lovejoy LLP

[57] ABSTRACT

A system for tracking an object (for example tracking an automobile as it moves over streets) using an electronic map and a GPS receiver. The GPS receiver accepts data from a number of satellites and determines a GPS derived position and velocity. Based on the previous position of the object, the GPS derived position, the velocity, the DOP and the continuity of satellites for which data is received, the system determines whether the GPS data is reliable. If the GPS data is reliable, the previous position of the object is updated to the GPS derived position. The updated position is then matched to a map of roads.

68 Claims, 5 Drawing Sheets

OTHER PUBLICATIONS

GMD–Spiegel, No. 2, 1979, Graphic Data Processing, "Automatic Vehicle Position Finding with Couple Navigation and Digital Town Map," Wolfgang Appelt (includes English translation).

"Evaluation of an AVM System Implemented City–Wide in St. Louis, A Summary Report," Gilbert C. Larson (no date).

"Computer Map Generation in an Automatic Vehicle Monitoring System," James F. O'Connor, May 1979.

"Some Navigational Concepts for Remotely Piloted Vehicles," J.W. Lyons, J.D. Bannister, J.G. Brown (no date).

"Comparative Analysis of Six Commercially Available AVL Systems," Edward N. Skomal (no date).

"A Report on the Boeing Fleet Location and Information Reporting System (FLAIR®)," R.W. Lewis and T.W. Lezniak (no date).

"Track with FLAIR," Boeing (no date).

"A Dead Reckoning/Map Correlation System for Automatic Vehicle Tracking," Thomas W. Lezniak, Richard W. Lewis and Robert A. McMillen (no date).

"Experimental Study on the Possibility of Locating Land–based Vehicles LOLA," Final Report on BMFT Research Project (no date).

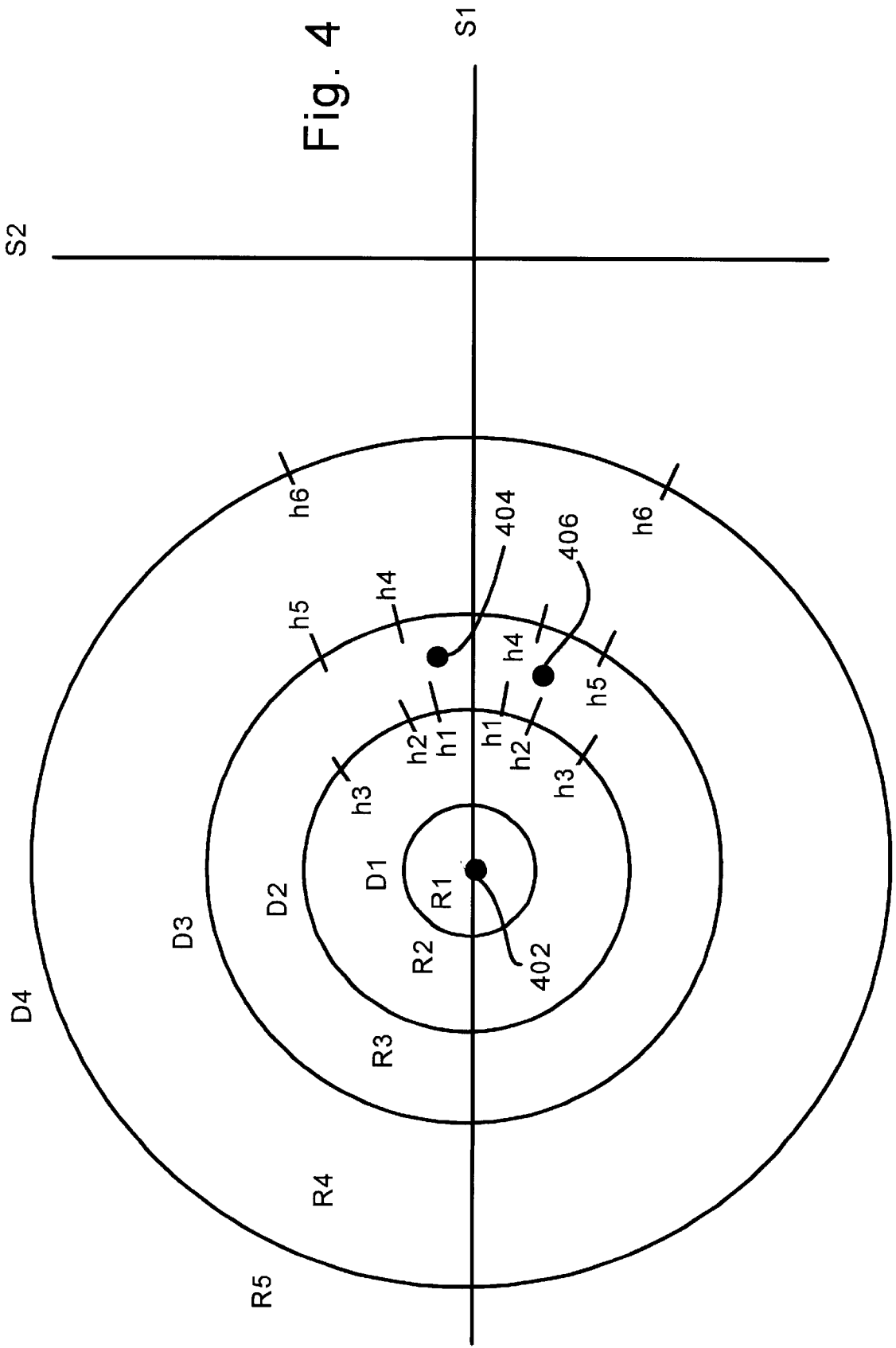

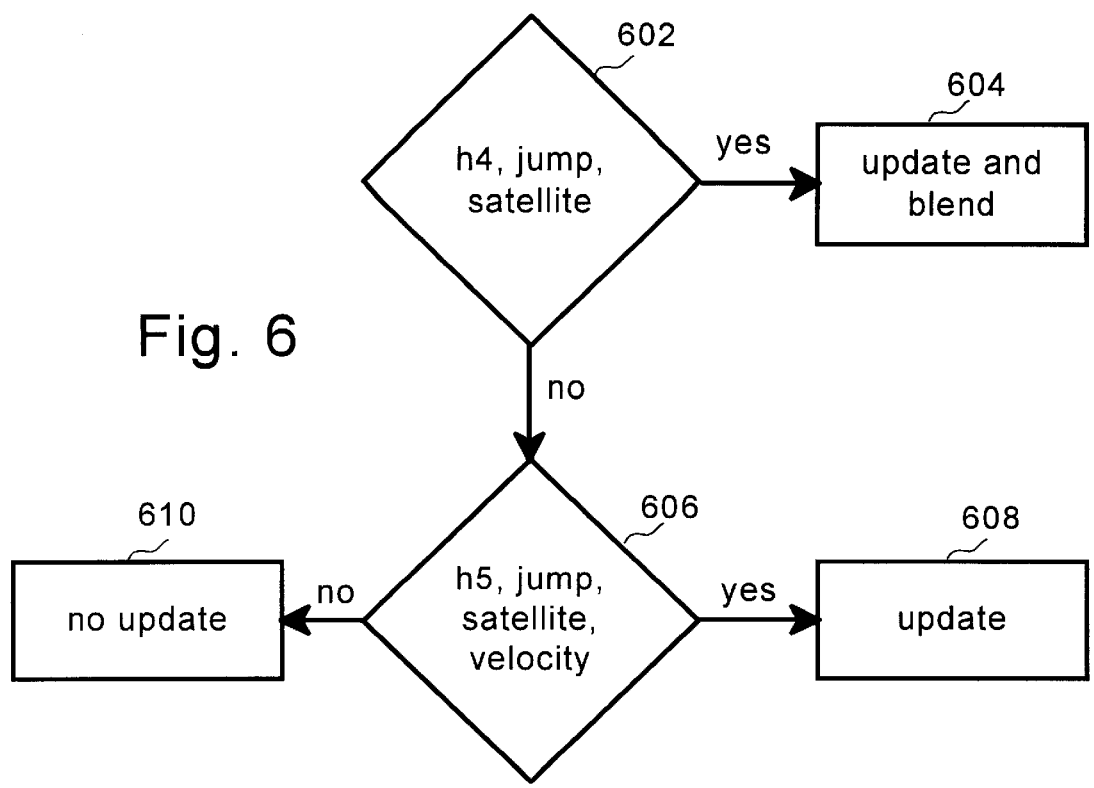
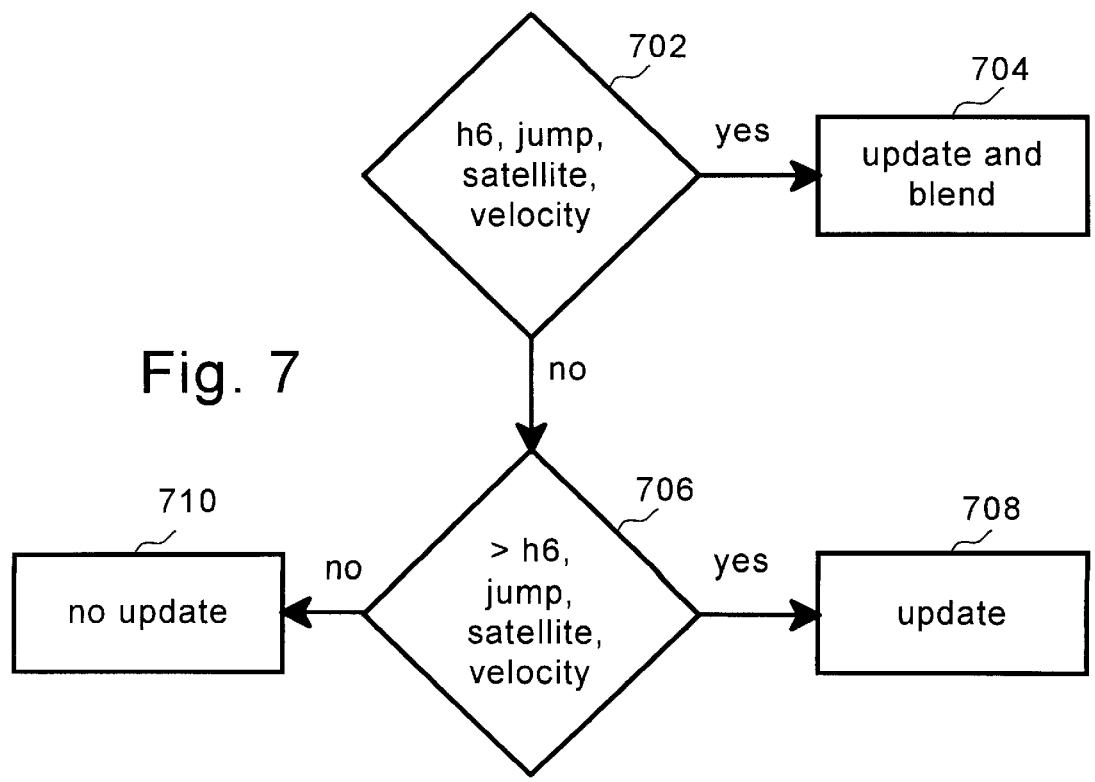

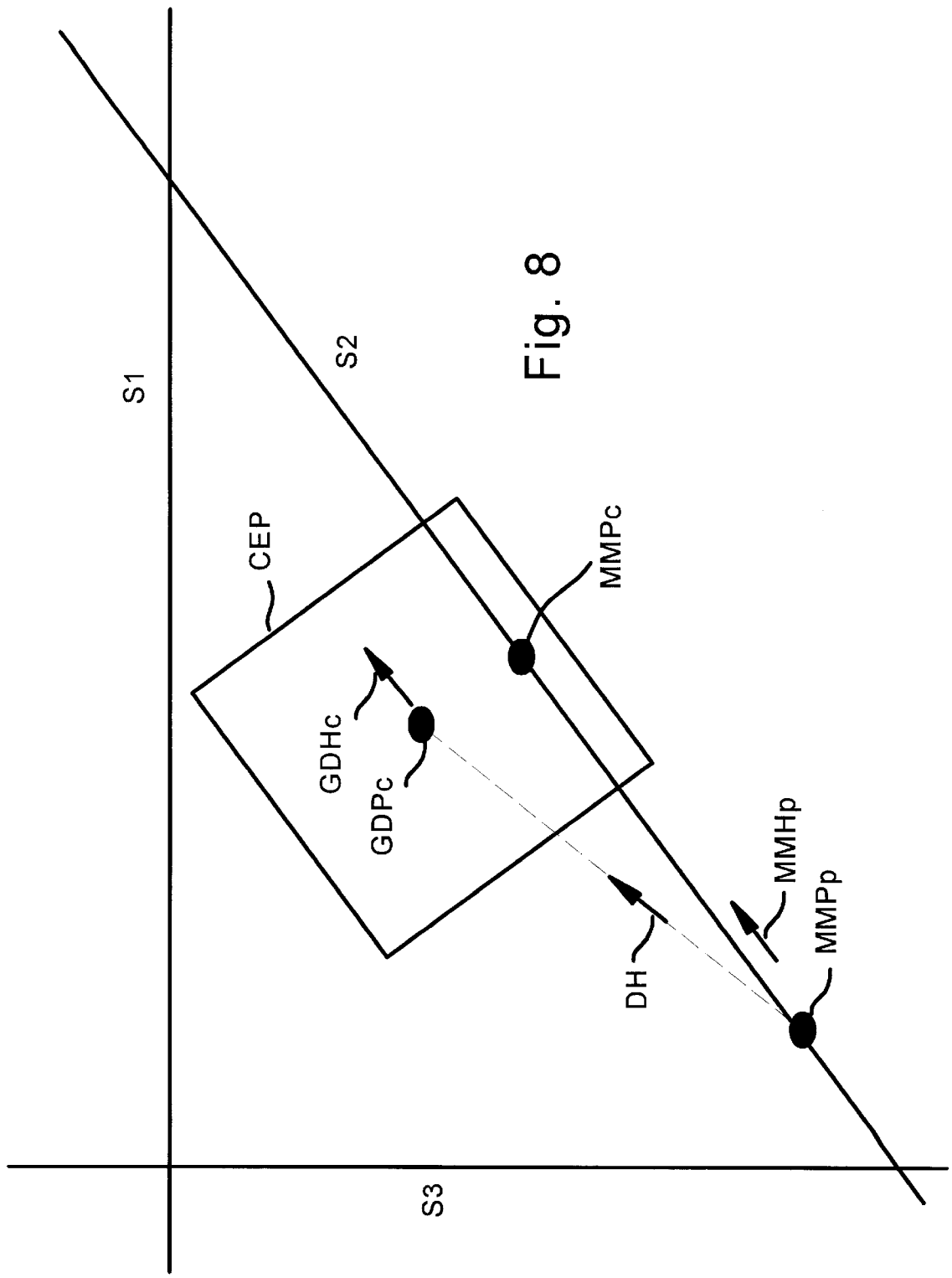

NAVIGATION SYSTEM USING GPS DATA

BACKGROUND OF THE INVENTION

1. Field of the Invention

The present invention relates generally to a system for tracking objects using GPS data; for example, tracking vehicles as they move over streets.

2. Description of the Related Art

A variety of automatic vehicle navigational systems have been developed and used to provide information about the actual location of a vehicle as it moves over streets. A common purpose of the vehicle navigational systems is to automatically maintain knowledge of the actual location of the vehicle at all times as it traverses the streets (i.e., track the vehicle). A given navigational system may be utilized in the vehicle to provide the vehicle operator with knowledge of the location of the vehicle and/or allow a central monitoring station to monitor the location of one or more vehicles.

For example, one general approach to such vehicle navigational systems is known as "dead reckoning," in which the vehicle is tracked by advancing a "dead reckoned position" from measured distances and headings. A system based upon dead reckoning principles may, for example, detect the distance traveled and heading of the vehicle using distance and heading sensors on the vehicle. The distance and heading data is processed by, for example, a computer using known equations to calculate a dead reckoned position of the vehicle. As the vehicle moves along a street, an old dead reckoned position is updated to a new or current dead reckoned position in response to the distance and heading data being provided by the sensors.

One problem with prior systems using dead reckoning is the accumulation of error that occurs as the dead reckoned positions are advanced. This error occurs, in part, as a result of inherent limitations on the achievable accuracy of the distance and heading sensors, which thus provide data that do not precisely identify the distance traveled nor the heading of the vehicle. Unless compensation for this error is made, the dead reckoned positions will become increasingly imprecise or inaccurate. Prior dead reckoning vehicle navigational systems have been developed and have attempted to solve this problem of the accumulation of error by providing additional information to the dead reckoned positions.

One example of additional information used to limit the error in a dead reckoning system is an electronic map. An electronic map consists of geographically referenced electronic data quantifying a physical, social or economic system. The range of information included in electronic maps is unlimited. For example, electronic maps could include data representing longitude, latitude, altitude, distances between elements, driving time, parcel numbers, tax information, tourist information, etc. Additionally, storing a map as a file on a computer allows for unlimited software applications to manipulate that data.

One example of a system that uses an electronic map is disclosed in U.S. Pat. No. 4,796,191, Vehicle Navigation System and Method. In this system, a dead reckoning component accepts raw sensor data and combines this data with history information to produce a new vehicle location from the previous location. This is the basic process of computing a distance traveled and a heading from the sensor data available. The available navigation sensors include differential odometers, vehicle odometers, compass, gyroscopes, inclinometers, defogger shunts and GPS receivers.

The vehicle odometer provides a count that represents distance traveled. The count can be cumulative and signed, so an increase represents travel in one direction, a decrease represents travel in the other direction. The count is proportional to some fraction of a wheel rotation.

The differential odometer is similar to the vehicle odometer. It gives distance traveled as a count that represents a fraction of a wheel rotation. It is a pair of sensors, one for the left wheel of a vehicle and one for the right wheel. Both sensors can be mounted on the front wheels or both sensors can be mounted on the back wheels. The left and right counts give not only distance traveled, but also relative heading. The difference between left and right wheel counts, combined with the physical dimensions of the vehicle, give the amount the vehicle has turned. This sensor is subject to low frequency drift when used to measure heading. It can appear that the vehicle is slowly turning when it is really going straight.

A gyroscope is another source of relative heading. It has properties similar to the differential wheel sensors. These sensors measure rate of turn per unit of time, so the signal may need to be integrated over time to obtain heading change.

A magnetic compass provides absolute heading information. The primary problem with a compass is that it is susceptible to high frequency noise. It also has problems with the variation in the magnetic environment caused by natural and man made objects. Bridges, overpasses, tunnels, and large steel frame buildings can cause severe interference with a compass. They can even remagnetize a vehicle. The flux gate compass measures the component of the earth's magnetic field that lies in the horizontal plane. It provides an x and y offset relative to some center point. This offset translates into a physical heading. As a result of the changing magnetic environment of a vehicle, this center and magnitude of the offset change with time and must be carefully tracked. Remagnetization of the vehicle may require recalibration of the compass. The absolute heading obtained from a compass can be combined with relative heading from differential wheel sensors or gyroscope to obtain a better heading than can be obtained from either type of sensor used alone. This is possible because the sensors have complimentary error properties, the compass does not drift and the relative heading sensors is not as susceptible to high frequency noise.

Inclination of the vehicle in hilly regions introduces error into the heading computed from the compass. The inclinometer allows the inclination to be measured and the compass heading to be corrected. The sensor provides pitch and roll signals proportional to the pitch and roll angles of the vehicle.

The defogger shunt provides correction to the compass heading for errors caused by vehicle generated magnetic fields. The name of the sensors derives from the most common example of a vehicle generated magnetic field, the rear window defogger circuit. A defogger shunt detects the operation and strength of the magnetic field. Calibration of the defogger determines the vector and scale to associate with this input for compass correction.

Dead reckoning uses a combination of a subset of the above-described sensors to determine the position of the vehicle being tracked. Dead reckoning contains error that grows with time and/or distance. To know where we are on a particular road network and to keep the dead reckoning errors bounded, at least one prior art system uses map matching.

Map matching uses an electronic map database (which includes street information) and the output of dead reckoning to derive a new position on the road network, when possible. Updating a vehicle position on the map in this manner produces high quality navigation and provides feedback to dead reckoning that helps maintain sensor calibration.

Although the above-described system provides an accurate navigational tool, such a system can be expensive. As described above, the system requires a combination of a number of sensors and specialized electronics. No one sensor or combination has traditionally been able to supply sufficient data to reliably derive a dead reckoned position. As more sensors are used, the accuracy of the system increases; however, the system becomes more sophisticated and the cost of the system increases. Since prior art navigation systems use many sensors, these systems are very expensive. Another problem with the above described system is that it is difficult to install, maintain and calibrate the sensors on an automobile.

Additionally, navigation performance for the above described system can degrade if the map matching relocates the vehicle's position to an incorrect road. This can occur because of an extreme anomalous magnetic field, wheel slippage or map errors. Another disadvantage arises if the difference between the computed vehicle position and the nearest appropriate road is too large, i.e. exceeds a predetermined allowable error estimate. Under these circumstances the dead reckoning system will not update its position. Once an incorrect update has been made or the errors become too large, precision navigation may not be automatically regained without manual intervention. Another disadvantage of some prior art navigation systems is that they typically require that the operation of the system be visually monitored by the operator and manually calibrated and that, after calibration, correct initial position information be entered manually.

Another prior art navigational system tracks vehicles using GPS data. Based on the GPS data, the system determines a two or three dimensional location of the vehicle. This location is then superimposed on a map. There is no map matching process used to coordinate the display of the vehicle's location to a street, and the GPS data tends to jump and be unreliable.

Another prior art system uses the dead reckoning and map matching process described above (with respect to U.S. Pat. No. 4,790,191) in combination with GPS sensors. That is, when the relative navigation sensors described above (vehicle odometer, differential odometer . . . ) are providing data within an acceptable error, the system does not use the GPS data to update the vehicle's position. The system does use GPS data to test whether the data from the relative sensors are within the acceptable error. If not, the system resets the vehicle's position to a position calculated based on the GPS data and then the system performs a dead reckoning cycle followed by map matching. This system can be expensive, and difficult to install, maintain and calibrate.

SUMMARY OF THE INVENTION

The present invention, roughly described, provides for a system that tracks objects uses GPS data to map match with an electronic map.

GPS navigation errors do not accumulate in the same manner as traditional relative navigation sensors since GPS sensors are absolute position sensors. However, GPS sensors have traditionally not been very accurate either. Position errors are common and the GPS derived position will tend to jump around even when the vehicle is not moving. The result is that a GPS based navigation system would not necessarily give smooth tracking of the vehicle and cannot readily identify the streets being traveled. Prior pitfalls of using GPS data for navigation are overcome with the present invention by using a new method for accepting or rejecting data and combining the GPS data with map matching.

A GPS sensor receives data from a plurality of satellites and determines a GPS derived position and velocity. Based on the previous position of the object and the GPS derived position, velocity, DOP and continuity of the satellite constellation for which data is received, the system determines whether the GPS data is reliable. If the GPS data is reliable, the previous position of the object is updated to the GPS derived position. The updated position is then matched to a map of roads.

One embodiment of the current invention includes the steps of determining whether GPS data is reliable, updating the object's position based on the GPS data if the GPS data was determined to be reliable and matching the object's updated position to an electronic map if the GPS data was determined to be reliable.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 4 depicts a portion of an electronic map with four circles superimposed on the map to illustrate regions for processing GPS data.

FIG. 6 is a flow chart further describing a portion of the method depicted in FIG. 3.

FIG. 7 is a flow chart further describing a portion of the method depicted in FIG. 3.

FIG. 8 is a partial diagram of map showing a GPS derived position and two map matched positions.

DETAILED DESCRIPTION

GPS is a satellite based navigation system operated and maintained by the U.S. Department of Defense. GPS consists of a constellation of 24 satellites providing worldwide, 24 hour, three dimensional navigational services. Although originally conceived for military needs, GPS has a broad array of civilian applications including surveying, marine, land, aviation, timing synchronization and vehicle navigation.

By computing the distance to GPS satellites orbiting the earth, a GPS receiver can calculate an accurate position of itself. This process is called satellite ranging. A two dimensional position calculation requires data from three satellites. A three dimensional position calculation, which includes altitude, requires data from four satellites. GPS receivers can also provide precise time for network sync applications, and speed and course measurement for navigation and other applications.

Differential GPS is a sophisticated form of GPS navigation which provides even greater positioning accuracy. Differential GPS relies on error corrections generated by a GPS receiver placed at a known location. This receiver, called a reference station, calculates the error in the satellite range data and outputs corrections for use by mobile GPS receivers in the same locale. Differential GPS eliminates virtually all the measurement error in the satellite ranges and enables a highly accurate position calculation.

GPS satellites transmit a Coarse/Acquisition (C/A) code and satellite data modulated into the LI carrier frequency (1575.42 MHZ). The C/A code is a unique number for each satellite. The satellite data transmitted by each satellite includes a satellite almanac for the entire GPS system, its own satellite ephemeris and its own clock correction.

The system almanac contains information about each of the satellites in the constellation, ionospheric data and special system messages. The ephemeris includes detail orbital information for each specific satellite. Ephemeris data changes hourly, but is valid (in some cases) for up to four hours. The performance of a GPS receiver at power on is determined largely by availability and accuracy of the satellite ephemeris data and the availability of a GPS system almanac.

Figure 1:
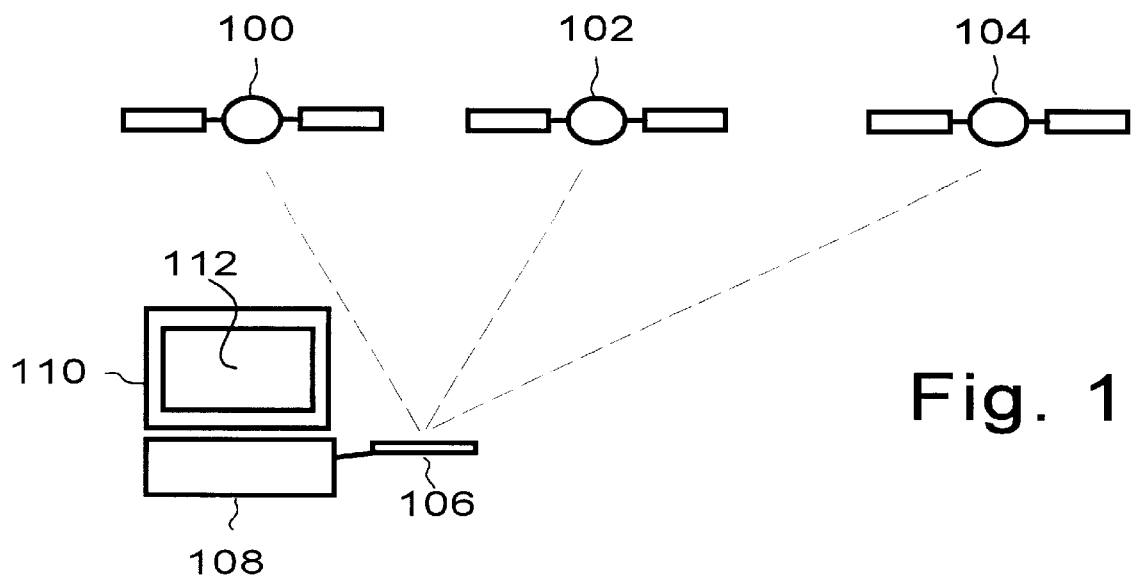
FIG. 1 depicts one exemplar hardware system for tracking objects using GPS data.

FIG. 1 shows three GPS satellites 100, 102 and 104. Although only three satellites are depicted, more than three can be used. GPS satellites 100, 102 and 104 transmit a signal (shown by dashed lines) to GPS receiver 106 which processes the data received from the satellites. The output of GPS receiver 106 is sent to computer 108, which includes a monitor 110. Computer 108 can be a standard PC using a 486 processor, Pentium® processor or other suitable processor. Monitor 110 is adapted to display a map 112.

An example of a suitable GPS receiver is the SVeeSix GPS module from Trimble navigation. The SveeSix is a 6 channel GPS receiver module designed for high performance GPS applications. The receiver module contains a reference oscillator, synthesizer and IF circuits, digital signal processing hardware, a 16 bit microprocessor, serial interface circuitry, an internal power supply and a real time clock. GPS receiver 106 includes an antenna which receives the signals from the satellites. GPS signals do not penetrate conductive surfaces. Therefore, the antenna must have a relatively unobstructed view of the sky. The SveeSix includes all the circuitry necessary to automatically acquire GPS satellite signals, track up to eight GPS satellites and compute the GPS derived position, and velocity (speed and heading).

GPS position accuracy is degraded by atmospheric distortion, satellite and receiver clock errors, and Selective Availability. The U.S. Department of Defense, through a program called Selective Availability, intentionally degrades GPS accuracy for civilian users. The Selective Availability program creates position errors by modifying the apparent position of each satellite introducing random dither into each satellite's clock. The dilution of precision (DOP), a measure of error, is a description of the uncertainty of particular GPS data.

The position being tracked is the position of the antenna of GPS receiver 106. Alternative embodiments can be designed to track an object other than the antenna, whose position relative to the antenna is known. If GPS receiver (with the antenna) 106 is located in an automobile, then the system tracks the location of the automobile. Alternatively, GPS receiver (and an antenna) 106 could be held by a walker or runner. In one embodiment, computer 108 is a laptop so that the system is mobile. Alternatively, GPS receiver 106 can communicate with computer 108 via a cellular or telephone modem.

Figure 2:
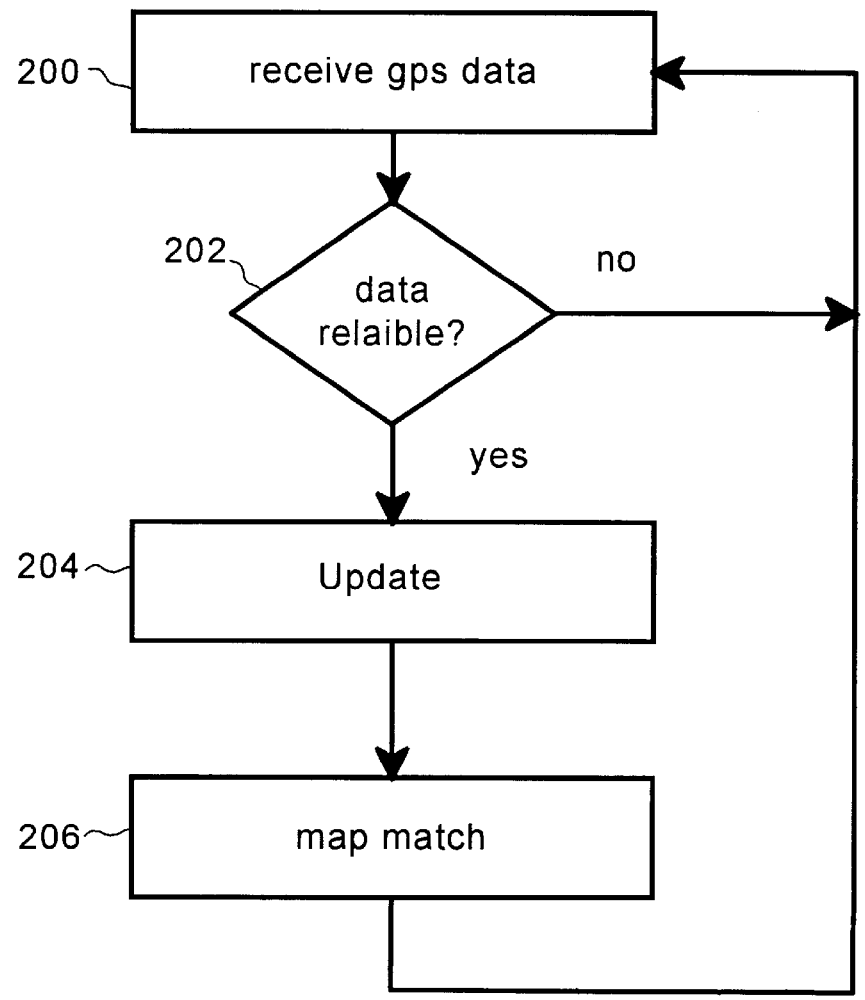
FIG. 2 is a flow chart explaining the current invention.

FIG. 2 is a flow chart depicting an exemplar method for practicing the present invention. In step 200 the system receives GPS data. As depicted in FIG. 1, one means for receiving GPS data is for GPS receiver to accept signals from a satellite, processes the signals and send the processed information to the system. Alternatively, the system can receive GPS data via a modem, a data file, simulation data, directly from satellites, etc. In the disclosed embodiment, the GPS data sent by receiver 106 to computer 108 includes a GPS derived position (longitude and latitude), GPS derived velocity, DOP and a list of the members of the satellite constellation. From the longitude and latitude, it is possible to figure out the displacement from the previous position. From the GPS derived velocity, a GPS derived speed and a GPS derived heading can be calculated. In many cases, the velocity vector is only reliable if the speed is above 25 miles an hour. The satellite constellation includes a list of satellites for which the GPS receiver received data. Experimentation has shown that GPS data is more reliable when the GPS receiver is receiving data from the same satellites for an extended period of time. When the satellite constellation changes, the GPS data tends to be less reliable.

In step 202, the system determines whether the most recently received GPS data is reliable. The input to step 202 includes the GPS data and the previous position and heading of the object being tracked. If the GPS data is not determined to be reliable then the method loops back to step 200. If the GPS data is reliable, then (in step 204) the system updates the objects position. The input to step 204 includes the GPS data and the previous heading. In the disclosed embodiment, step 204 can includes updating the object's position from the previous position to the GPS derived position. Based on the results of step 202 the object's heading is either updated to the GPS derived heading or is updated to a blend. The system updates the heading to a blend by determining a difference between the previous heading (from map matching) and the GPS derived heading. The GPS derived heading is altered by ⅓ of that difference, toward the previous heading. That altered GPS derived heading becomes the new heading. For example, if the previous heading was 3° and the GPS derived heading is 6°, then the blend of the two headings is 5°. Alternative embodiments can use different methods of blending the heading, can similarly blend the position information or perform other suitable update steps.

Subsequent to step 204, the systems performs map matching step 206. That is, the system matches the updated position and heading from step 204 to an electronic map. The input to map matching step 206 includes the updated position and heading from step 204, an estimate of accuracy, the previous position, the previous heading and the electronic map. The basic process of map matching includes identifying street segments that are candidates for the most probable street that the vehicle is traveling on, selecting the best candidate by various criteria, and identifying the most probable point on that street as the new estimate of the vehicle position (the map matched position).

The output of map matching step 206 is a new position and heading, called the map matched position and map matched heading. It is the map matched position on the electronic map that is reported to the user of the system via monitor 110. After step 206 is complete, the system loops back to step 200. During the next iteration of steps 200–206, the most recently computed map matched position and map matched heading become the "previous position" and "previous heading." That is, when new GPS data is received in step 200, that new data is compared to the position and heading from the last completed map matching step 206.

The method of step 202 is based on several parameters derived from the previous vehicle position and the current GPS data, including previous heading, distance between the last position and the GPS derived position; heading from the previous position to the current GPS derived position (displacement heading); heading as reported by GPS (GPS derived heading based on velocity); DOP; satellite constellation and a jump indication. The previous heading is the direction of the vehicle at the time of the last position update (e.g. after the last completed map matching step). The distance between the previous position and the current GPS derived position is a key element for controlling the logic of the method. For example, if the GPS derived position is very close to the current vehicle position, it may mean that the GPS receiver 106 is not moving or is moving very slowly and nothing should be updated for now. The velocity, including heading and speed, provided by GPS is only reliable if the vehicle is moving fast enough. As discussed above, the DOP values are a measure of GPS error or uncertainty. DOP can be used in two ways. If DOP values are very large, it is an indication that the GPS receiver is having difficulty providing a good solution and the results may have a large error. So if the DOP is above some threshold, the GPS information can be ignored, step 202 would not determine that the data is reliable and no new position would be updated. Secondly, since the DOP value provides some indication of position accuracy, it can be used for map matching. This is usually done by scaling the DOP number to provide a reasonable region of uncertainty.

The system needs line of sight access to at least three satellites in order to determine a position. The satellite constellation information reported by GPS can be used to determine when GPS receiver 106 has started using a different set of satellites. This may happen as a result of normal satellite motion or line of sight obstruction. A satellite change is frequently associated with sudden changes in the GPS report, so the system can use this information as an indicator of stability and reliability of the GPS information. The satellite constellation is stable if there is no change in the membership of the satellites used to calculate the GPS derived position. Additionally, the system checks to see if the report is based on the minimum number of satellites.

Another way of checking for stability is to check for unreasonable jumps in the GPS derived position. From a previous GPS derived position the system can compute a heading to the current GPS derived position and compare it to the current GPS heading. If this computed heading is significantly different from the GPS derived heading, the GPS report may be unstable. This comparison should not be done on two GPS reports that are close together since this computed heading may have too much error (e.g. due to low velocity). A reasonable minimum distance to require between the two GPS reports is 150 feet. A heading difference, for example, of 60° will detect most GPS jumps. A jump less than 60° is considered stable.

The basis of the method is to simulate dead reckoning using GPS reports with filtering, and then apply map matching. The GPS data will only be followed when it is clear from the parameters described above that a real position change could be made. The system should accept a position change that occurs in the same direction in which the object being tracked was traveling more readily then the system should accept a position change in a divergent direction. The greater the divergence, the more caution should be exercised.

Figure 3:
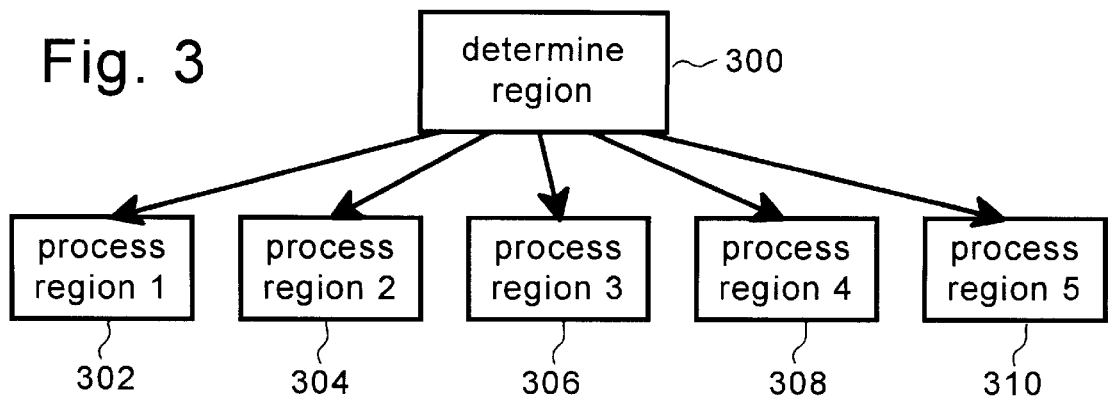
FIG. 3 is a flow chart further describing a portion of the method depicted in FIG. 2.

FIG. 3 is a flow chart which explains steps 202 and 204 in more detail. When determining whether the GPS data is reliable, the first step is to compare the GPS derived position to the previous position (e.g. from map matching). In step 300, the system determines which region the GPS derived position falls within. FIG. 4 shows a portion of an electronic map that includes two streets S1 and S2. Location 402 is the previous position and the previous heading is along street S1, toward S2. Locations 404 and 406 represent two example GPS derived positions. The map is broken up into five regions: Region 1 (R1), Region 2 (R2), Region (R3), Region 4 (R4) and Region 5 (R5). The invention can be practiced with more or less than 5 regions. To create 5 regions 4 distances are chosen (D1, D2, D3 and D4). In the disclosed embodiment, D1=150 feet, D2=300 feet, D3=450 feet and D4=1500 feet. Other suitable values can be used. The distance D1 is shown as a circle labeled D1 with its center at location 402. The distance D2 is shown as a circle labeled D2 with its center at location 402. The distance D3 is shown as a circle labeled D3 with its center at location 402. The distance D4 is shown as a circle labeled D4 with its center at location 402. Region 1 is the area within circle D1. Region 2 is the area within circle D2 and not within circle D1. Region 3 is the area within circle D3 and not within circle D2. Region 4 is the area within circle D4 and not within circle D3. Region 5 is the area outside circle D4. For example, if the GPS derived position is location 404, in step 300 the system will determine that the GPS derived position is in Region 3.

After the system determines the proper region, the system processes the data for that region. For each set of GPS data, which includes only one GPS derived position, the system will perform one of steps 302, 304, 306, 308 and 310. If the GPS derived position is in region 1, the system performs step 302. If the GPS derived position is in region 2, the system performs step 304. If the GPS derived position is in region 3, the system performs step 306. If the GPS derived position is in region 4, the system performs step 308. If the GPS derived position is in region 5, the system performs step 310.

In step 302, the system determines that the GPS derived position is too close to the previous position to allow a change in the position. The system cannot reliably determine a good heading because the position change is very small. Thus, the system is not able to determine that the GPS data is reliable. One alternative is to allow the GPS velocity to validate the data within Region 1. For example, if the GPS derived velocity is above 30 mph, the system could determine that the GPS data is reliable and update the object's position to the GPS derived position.

Figure 5:
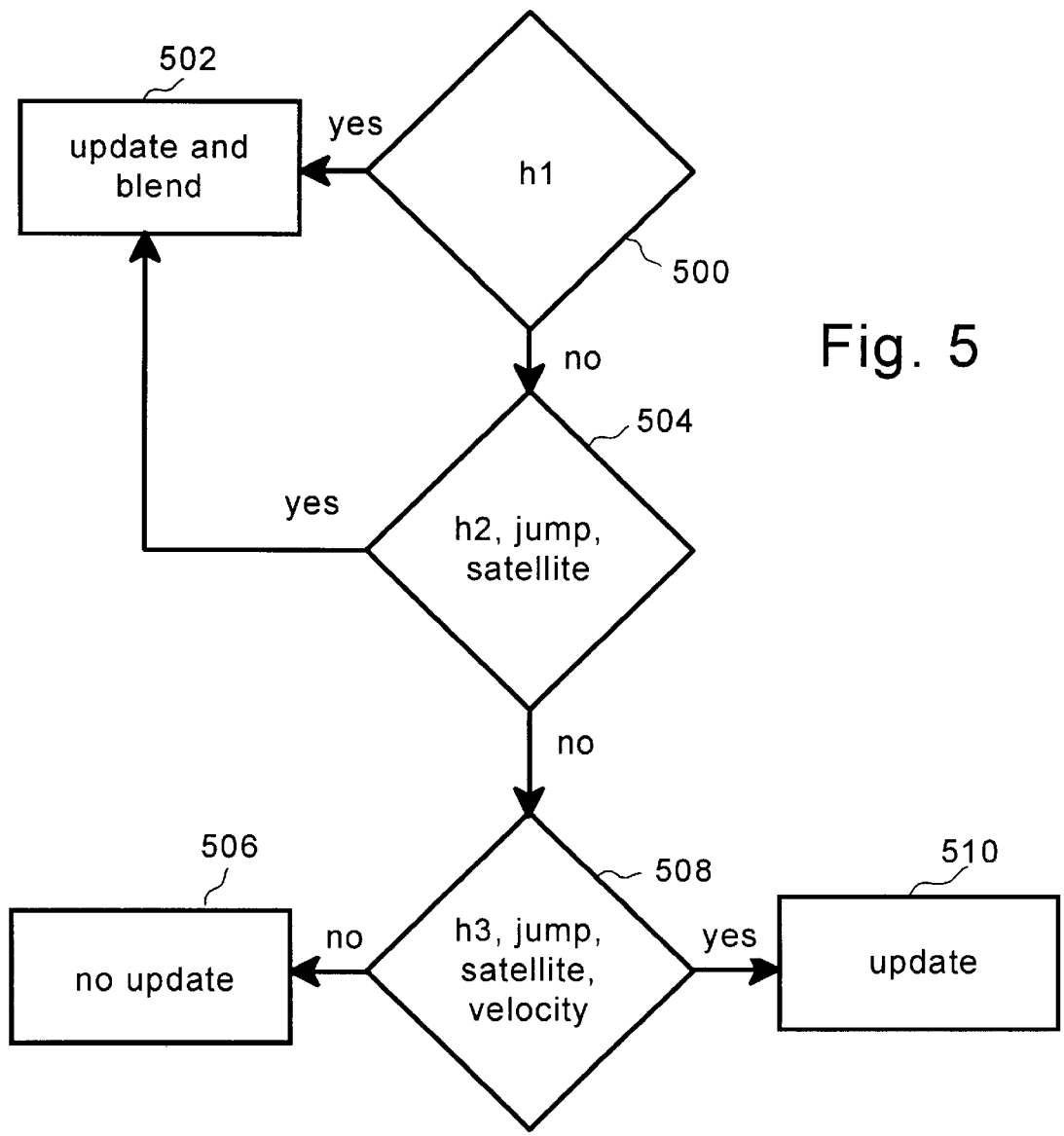
FIG. 5 is a flow chart further describing a portion of the method depicted in FIG. 3.

FIG. 5 is a flow chart detailing the method of step 304. In order to understand the steps in FIG. 5, reference is made back to FIG. 4. Regions 2–4 are subdivided according to heading. The system is in possession of three sets of heading information. First, the system knows the previous heading, which is the output from the previous map matching step. Second, GPS receiver 106 provides a GPS derived heading based on velocity. Third, the system determines the direction from the previous position to the GPS derived position (the displacement heading). The GPS derived heading and the displacement heading are compared to the previous heading The comparison is made with reference to thresholds. Region 2 includes three thresholds: h1, h2 and h3. Thus, a first subdivision includes headings that are within h1 of the previous heading. A GPS derived heading is within h1 of the previous heading, if the difference between the GPS derived heading and the previous heading is less than or equal to the threshold. For example, if h1=10°, the GPS derived heading is 20° and the previous heading is 12°, than the GPS derived heading is within h1 of the previous heading because the difference between the GPS derived heading and the previous heading (20°−12°=8°) is less than or equal to the threshold h1 (10°). FIG. 4 graphically shows the heading thresholds for comparing the displacement heading to the previous heading.

A second subdivision of Region 2 includes headings within threshold h2 of the previous heading but more than threshold heading h1 from the previous heading. A third subdivision includes headings within threshold heading h3 of the previous heading but more than threshold heading h2 from the previous heading. Example thresholds for region 2 include h1=10°, h2=25° and h3=45°. Note that the heading thresholds shown in FIG. 4 have plus and minus values; thus, a heading difference of 8° or −8° would be within h1.

In step 500 of FIG. 5, the system determines whether the GPS derived heading and the displacement heading are within threshold h1 of the previous heading. If the GPS derived heading and the displacement heading are within threshold h1 of the previous heading then the GPS data is determined to be reliable and the step of updating (step 204 of FIG. 2) is accomplished in step 502 by updating the position of the object to the GPS derived position and blending the heading as described above. If the GPS derived heading and the displacement heading are not within h1 then, in step 504, the system determines whether the GPS derived heading and the displacement heading are within h2 of the previous heading, jump is stable and the satellite constellation is constant (e.g. no change in members of constellation). If the conditions of step 504 are met, the GPS data is determined to be reliable and the step of updating (step 204 of FIG. 2) is accomplished in step 502. Otherwise, the system checks in step 508 as to whether both heading measures are within h3 of the previous heading, jump is stable, the satellite constellation is constant and velocity is above the velocity threshold. One example velocity threshold is 30 mph. If the conditions of step 508 are met, then the GPS data is determined to be reliable and the step of updating (step 204 of FIG. 2) is accomplished in step 510 by updating the previous position and previous heading to the GPS derived position and GPS derived heading. Otherwise, no update is made to the current heading or current position (step 506). Even if no update is made, the system may save the current GPS data for purposes of comparing the current GPS data to future GPS data in order to validate the future data.

FIG. 6 provides a flow chart further describing step 306 of FIG. 3. As can be seen from FIG. 4, region 3 is subdivided by two heading thresholds: h4 and h5. Example thresholds for region 3 include h4=20 and h5=30°. In step 602 the system determines whether the GPS derived heading and the displacement heading are within heading threshold h4 of the previous heading, jump is stable and the satellite constellation is constant. Looking at FIG. 4 it can be seen that if the previous position was location 402 and the GPS derived position is location 404, then the displacement heading would be within threshold h4. That is, a line is drawn from location 402 to location 404. The angle between that line and S1 is the displacement heading which is less than h4. This is graphically depicted in FIG. 4 since the line passing through points 402 and 404 would intersect D3 under the hash mark labeled h4. If the GPS derived position is location 406, then the displacement heading would not be within threshold h4 but would be within threshold h5 of the previous heading.

If the conditions of step 602 are met, then the GPS data is determined to be reliable and the step of updating (step 204 of FIG. 2) is accomplished in step 604 by updating the position of the object to the GPS derived position and blending the heading as described above. Otherwise, in step 606, the system determines whether the displacement and GPS derived headings are within heading threshold h5 of the previous heading, jump is stable, satellite constellation is constant and velocity is above the threshold. If the conditions of step 606 are met, then the GPS data is determined to be reliable and the step of updating (step 204 of FIG. 2) is accomplished in step 608 by updating the previous position and previous heading to the GPS derived position and GPS derived heading. Otherwise, no update is made to the current heading or current position (step 610).

FIG. 7 shows a flow chart describing step 308 of FIG. 3. This corresponds to the situation when the GPS derived position falls within region 4. Region 4 includes one heading threshold h6. An example value for h6 is approximately 30°. In step 702, the system determines whether the displacement heading and the GPS derived heading are within threshold h6 of the previous heading, jump is stable, satellite constellation is constant and velocity is above the velocity threshold. If the conditions in step 702 are met then the GPS data is determined to be reliable and the step of updating (step 204 of FIG. 2) is accomplished in step 704 by updating the position of the object to the GPS derived position and blending the heading as described above. Otherwise, the system determines, in step 706, whether both the displacement and GPS derived headings are greater than h6 from the previous heading, jump is stable, satellite constellation is constant and velocity is above threshold. If the conditions in step 706 are met, then the GPS data is determined to be reliable and the step of updating (step 204 of FIG. 2) is accomplished in step 708 by updating the previous position and previous heading to the GPS derived position and GPS derived heading. Otherwise, no update is made to the current heading or current position (step 710).

If the GPS derived position is in region 5 and the satellite constellation is stable, then the GPS data is determined to be reliable and the step of updating (step 204 of FIG. 2) is accomplished by updating the previous position and previous heading to the GPS derived position and GPS derived heading; otherwise, no updates are made (step 310).

When no update is made (e.g. steps 506, 608, 710) the system does not update the object's position. Alternatively, the system can repeat the steps of FIGS. 3–7 comparing the current GPS data to data older than the previous set of data (e.g. two or more iterations ago). By comparing the GPS derived position with a position previous to the previous position, the GPS derived position is likely to be in a further region (e.g. in region 3 instead of region 1), therefore, increasing the chance that the system will determine the GPS data to be reliable. By comparing the GPS derived position with a position previous to the previous position the system is allowing map matching to occur more often, which in turn, provides more updates to a user.

After the system determines that the GPS derived data is reliable and advances the previous map matched position to the current GPS derived position, the system performs the step of map matching (step 206 of FIG. 2). FIG. 8, which will be used to explain the general theory of map matching, shows three streets S1, S2 and S3. Three points are shown on FIG. 8. The point MMPp is the previous map matched position (e.g. the output of the previous map matching step). MMPp is on street S2. Arrow MMHp indicates the previous map matched heading. Since MMPp is on S2, arrow MMHp is parallel to S2. Arrow MMHp is only being used to graphically depict the map matched heading. MMHp should actually be superimposed on street S2, but is shown next to S2 for demonstration purposes. For one embodiment electronic map, angles are measured relative to due east. That is, a heading of due east is 0°, with positive angles being measured counter clockwise. The point GDPc is the current GPS derived position. The arow GDHc represents the current GPS derived heading. FIG. 8 shows a dashed line from MMPp to GDPc. Along that dotted line is arrow DH, which represent the displacement heading.

The step of map matching (step 206) will determine whether a more probable position than the current GPS derived position exists. If it is determined that a more probable position does exist, then the current GPS derived position is changed or updated to a certain XY coordinate corresponding to a point on the street identified as MMPc, the current map matched position. The point MMPc may not coincide with the actual location of the object being tracked, but has been determined to be the most probable position at the time of updating. Alternatively, the step of map matching may determine that no position exists that is a more probable position than the current GPS derived position, which would result in no change or updating of the current GPS derived position. Another alternative includes updating the GPS derived position to a position which is a blend of the GPS derived position and a position on a street segment. For example, the step of map matching can update the GPS derived position to a position half way between the GPS derived position and the closest position to the GPS derived position that is on a street segment.

FIG. 8 also shows a square, labeled as CEP, surrounding point GDPc. Square CEP represents a contour of equal probability used to estimate the accuracy of the GPS derived position. The present invention provides and maintains as the object moves, an estimate of the accuracy of any given GPS derived position. The estimate embodies the concept that the actual location of the vehicle or object is never precisely known, so that the estimate covers the area that the vehicle is likely to be within. The estimate of the accuracy of the given GPS derived position can be implemented in a variety of forms and is used to determine the probability of potential update positions of a given GPS derived position to a map matched position. U.S. Pat. No. 4,796,191, incorporated herein by reference, explains one exemplar implementation of estimating the accuracy of a position as a probability density function or as a contour of equal probability. The present invention uses a simplified version of the contour of equal probability based on DOP such that the area within square CEP has a fixed probability of including the actual location of the vehicle. The area inside square CEP is called the area of uncertainty.

The CEP and area of uncertainty are determined based on the DOP. First, the DOP is scaled by a factor of 12. This scaling puts the DOP number into map units. One map unit equals 7.8227 feet. Thus, by multiplying the DOP by 12 and by 7.8227, the dimension of the DOP factor is converted into units of feet. This number is then used as the length of each side of the square representing the CEP. For example, if the DOP received by the system is 4, then the CEP would be represented by a square where each side was equal to approximately 375 feet (4*12*7.8227=375.4896). In the disclosed embodiment, the CEP is calculated during update step 204. However, the CEP could also be calculated during other steps, including step 206.

Map matching begins with the GPS derived position (GDPc) and GPS derived heading (GDHc) as determined by step 204. From the database of street segments, map matching locates those streets that are reasonable choices. This determination can be made through a multi-parameter evaluation and may include locating segments that agree with the vehicle heading within some threshold, streets segments that are close enough to the vehicle (e.g. whether a given line segment intersects or is within the region of uncertainty for the GPS derived position) and street segments that connect to segments that have been identified as most probable streets in the recent past. From these candidates a best street segment is selected. This choice may be made on the basis of some combination of closest distance, best match in heading, connection with past choices, and history of the sensor data. The end result is usually a selection of a most probable street. Sometimes the choice may be too ambiguous and the best decision is to make no choice at this time (i.e. just keep the GPS derived position). But if a most probable street is identified, the final step is to determine the most probable point on that street. This could be done by taking the closest point on the street. One alternative is to utilize the region of uncertainty as a probability distribution and compute the point on the street with the highest probability, which may be slightly different than the closest point. Another alternative allows the map matching step to determine that the most probable position of is a position not on a road. A more detailed description of the map matching process can be found in U.S. Pat. No. 4,796,191, Vehicle Navigation System and Method, incorporated herein by reference.

The point identified as the most probable point on the most probable street becomes the new map matched position (MMPc). The heading of the most probable street is used as the map matched heading. These values are then used to display the position of the object on the map.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for tracking an object using an electronic map and GPS data, comprising the steps of:

determining whether said GPS data is reliable;

updating said object's position based on said GPS data if said GPS data is determined to be reliable; and matching said object's updated position to said electronic map if said GPS data is determined to be reliable, said step of matching is performed without using data from navigation sensors other than one or more GPS sensors.

2. The method according to claim 1, wherein:

said step of matching uses said updated object position as an input and said step of matching outputs a map matched position; and said step of determining uses a previous map matched position to determine if said GPS data is reliable.

3. The method according to claim 2, wherein:

said step of matching further outputs a map matched heading; and said step of determining uses a previous map matched heading to determine if said GPS data is reliable.

4. The method according to claim 2, further including the step of:

reporting said object's position as being said map matched position.

5. The method according to claim 1, wherein said GPS data includes said GPS derived position, GPS derived velocity, satellite identification information and uncertainty information.

6. The method according to claim 1, wherein said step of updating includes updating a previous heading to a GPS derived heading.

7. The method according to claim 1, wherein said step of updating includes updating a previous heading to a blend of said previous heading and a GPS derived heading.

8. The method according to claim 7, wherein said previous heading is a previous map matched heading.

9. The method according to claim 1, wherein said step of determining includes comparing said GPS data to previous GPS data.

10. The method according to claim 1, wherein said step of determining includes comparing said GPS data to previous map matched data.

11. The method according to claim 1, wherein said step of determining includes comparing said GPS data to data previous to said previous map matched data.

12. The method according to claim 1, wherein said step of determining is based on a map matched position, a GPS derived position, a GPS derived velocity, GPS satellite identification information and GPS error information.

13. The method according to claim 1, wherein said step of determining does not determine that said GPS data is reliable if said GPS derived position is within a first distance from a previous position.

14. The method according to claim 1, wherein said step of determining determines that said GPS data is reliable if a GPS derived position is within a first distance from a previous position and a GPS derived velocity is greater than a velocity threshold.

15. The method according to claim 1, wherein said step of determining determines that said GPS data is reliable if:

a GPS derived position is greater than a first distance from a previous position and within a second distance from said previous position; and a displacement heading and a GPS derived heading are both within a first heading threshold of a previous heading.

16. The method according to claim 15, wherein said previous position is an immediately preceding map matched position.

17. The method according to claim 1, wherein said step of determining determines that said GPS data is reliable if:

said GPS derived position is greater than a first distance from a previous position and within a second distance from said previous position;

a displacement heading and a GPS derived heading are both greater than a first heading threshold and within a second heading threshold;

a jump indicator is stable;

a satellite constellation is constant; and a GPS derived velocity is above a velocity threshold.

18. The method according to claim 17, wherein:

said jump indicator is stable if said GPS derived heading is within a jump threshold of said displacement heading.

19. The method according to claim 1, wherein said step of updating blends a previous heading with a GPS derived heading if said step of determining computes that:

said GPS derived position is greater than a first distance from a previous position and within a second distance from said previous position; and a displacement heading and a GPS derived heading are within a first heading threshold of said previous heading.

20. The method according to claim 1, wherein an output of said step of matching is a map matched position and said map matched position is sometimes on a road.

21. The method according to claim 1, wherein an output of said step of matching is a map matched position and said map matched position is sometimes not on a road.

22. The method according to claim 1, wherein an output of said step of matching is a map matched position and said map matched position is sometimes said GPS derived position.

23. The method according to claim 1, wherein an output of said step of matching is a map matched position and said map matched position is a blend of said GPS derived position and a previous map matched position.

24. The method according to claim 1, wherein:

said GPS data includes error information;

said error information is used to define an area of uncertainty; and said step of matching uses said area of uncertainty to match a GPS derived position to a position on said electronic map.

25. The method according to claim 1, wherein:

said GPS data includes error information;

said error information is used to define an contour of equal probability; and said step of matching uses said contour of equal probability to match a GPS derived position to a position on said electronic map.

26. The method according to claim 1, wherein said step of matching said object's position includes:

finding a set of possible street segments;

determining a most probable street segment from said set of possible street segments; and determining a most likely position on said most probable street segment, said most likely position being a map matched position.

27. The method according to claim 1, wherein:

said step of matching said object's updated position determines a location on a road on said electronic map.

28. The method according to claim 27, further including the step of:

displaying at least a portion of said electronic map including said location on said road.

29. The method according to claim 1, wherein:

said step of matching said object's updated position identifies a road on said electronic map, said object being located on or near said road.

30. The method according to claim 1, further including the step of:

receiving said GPS data.

31. The method according to claim 1, further including the step of:

receiving satellite data; and sending said GPS data to a processing unit, at least one of said steps of determining, updating or matching being performed by said processing unit.

32. The method according to claim 31, wherein:

said satellite data being received by an antenna at an automobile; and said processing unit being at said automobile.

33. The method according to claim 31, wherein:

said satellite data being received by an antenna at an automobile; and said processing unit being at a location other than said automobile.

34. The method according to claim 31, wherein:

said GPS data is said satellite data.

35. The method according to claim 31, wherein:

said GPS data is based on said satellite data.

36. The method according to claim 31, wherein:

at least a portion of said GPS data being based on said satellite data.

37. A processor readable storage medium having processor readable program code embodied on said processor storage medium, said processor readable program code for programming a processor to track an object using an electronic map and GPS data, comprising first program code, said first program code determines whether said GPS data is reliable;

second program code, said second program code updates said object's position based on said GPS data if said GPS data is determined to be reliable; and third program code, said third program code matches said object's updated position to said electronic map if said GPS data is determined to be reliable, said third program code matches said object's updated position without using data from navigation sensors other than one or more GPS sensors.

38. The processor readable storage medium according to claim 37, wherein:

said third program code uses said updated object position as an input and outputs a map matched position and a map matched heading; and said first program code uses a previous map matched position and a previous map matched heading to determine if said GPS data is reliable.

39. The processor readable storage medium according to claim 37, wherein said second program code blends said previous heading and a GPS derived heading.

40. The processor readable storage medium according to claim 37, wherein said first program code uses a map matched position, a GPS derived position, a GPS derived velocity, GPS satellite identification information and GPS error information to determine if said GPS data is reliable.

41. The processor readable storage medium according to claim 40, wherein first program code determines that said GPS data is reliable if:

a GPS derived position is greater than a first distance from a previous position and within a second distance from said previous position; and a displacement heading and a GPS derived heading are both within a first heading threshold of a previous heading.

42. The processor readable storage medium according to claim 37, wherein:

said third program code identifies a location on a road on said electronic map.

43. The processor readable storage medium according to claim 37, wherein:

said third program code identifies a road on said electronic map, said object being located on or near said road.

44. A method for tracking an object using an electronic map, comprising the steps of:

comparing a GPS derived position to a previous map matched position;

comparing a GPS derived heading to a previous map matched heading;

determining whether said GPS derived position and said GPS derived heading are reliable based on said steps of comparing said GPS derived position and comparing said GPS derived heading; and matching said GPS derived position to said electronic map if said GPS derived position and said GPS derived heading are determined to be reliable, said step of matching is performed without using data from navigation sensors other than one or more GPS sensors.

45. The method according to claim 44, wherein said step of matching uses a blend of said previous map matched heading and said GPS derived heading to match said GPS derived position to said electronic map.

46. The method according to claim 44, wherein said step of matching uses said GPS derived heading to match said GPS derived position to said electronic map.

47. The method according to claim 44, wherein said step of determining determines that said GPS data is reliable if:

a GPS derived position is greater than a first distance from a previous position and within a second distance from said previous position; and a displacement heading and a GPS derived heading are both within a first heading threshold of a previous heading.

48. The method according to claim 44, wherein:

said step of matching said GPS derived position identifies a location on a road on said electronic map.

49. The method according to claim 34, wherein:

said step of matching said GPS derived position identifies a road on said electronic map, said object being located on or near said road.

50. The method according to claim 34, further including the step of:

receiving said GPS data.

51. The method according to claim 44, further including the step of:

receiving satellite data; and sending said GPS data to a processing unit, at least one of said steps of comparing a GPS derived position, determining whether said GPS derived position or matching said GPS derived position being performed by said processing unit.

52. A processor readable storage medium having processor readable program code embodied on said processor storage medium, said processor readable program code for programming a processor to track an object using an electronic map and GPS data, comprising first program code, said first program code compares a GPS derived position to a previous map matched position;

second program code, said second program code compares a GPS derived heading to a previous map matched heading;

third program code, said third program code determines whether said GPS derived position and said GPS derived heading are reliable based on said steps of comparing said GPS derived position and comparing said GPS derived heading; and fourth program code, said fourth program code matches said GPS derived position to said electronic map if said GPS derived position and said GPS derived heading are determined to be reliable, said fourth program code matches said GPS derived position without using data from navigation sensors other than one or more GPS sensors.

53. The processor readable storage medium according to claim 52, wherein said third program code determines that said GPS data is reliable if:

a GPS derived position is greater than a first distance from a previous position and within a second distance from said previous position; and a displacement heading and a GPS derived heading are both within a first heading threshold of a previous heading.

54. The processor readable storage medium according to claim 52, wherein:

said third program code determines a location on a road on said electronic map.

55. The processor readable storage medium according to claim 52, wherein:

said third program code identifies a road on said electronic map, said object being located on or near said road.

56. A method for tracking an object using an electronic map and GPS data, comprising the step of:

determining whether said GPS data is reliable; and matching said GPS data to an electronic map if said GPS data is determined to be reliable, said step of matching is performed without using data from navigation sensors other than one or more GPS sensors.

57. The method according to claim 56, wherein:

said step of matching said GPS data uses a GPS position to determine a location on a road on said electronic map.

58. The method according to claim 56, wherein:

said step of matching said GPS data identifies a road on said electronic map, said object being located on or near said road.

59. The method according to claim 56, further including the step of:

receiving said GPS data.

60. The method according to claim 56, further including the step of:

receiving satellite data; and sending said GPS data to a processing unit, said steps of matching being performed by said processing unit.

61. The method according to claim 56, wherein said step of determining determines that said GPS data is reliable if:

a GPS derived position is greater than a first distance from a previous position and within a second distance from said previous position; and a displacement heading and a GPS derived heading are both within a first heading threshold of a previous heading.

62. The method according to claim 56, wherein:

said step of determining uses a previous map matched position to determine if said GPS data is reliable.

63. A processor readable storage medium having processor readable program code embodied on said processor storage medium, said processor readable program code for programming a processor to track an object using an electronic map and GPS data, said processor readable program code comprising first program code, said first program code determines whether said GPS data is reliable; and second program code, said second program code matches said GPS data to an electronic map if said GPS data is determined to be reliable, said second program code matches said GPS data without using data from navigation sensors other than one or more GPS sensors.

64. The processor readable storage medium according to claim 63, wherein:

said second program code uses a GPS position to identify a location on a road on said electronic map.

65. The processor readable storage medium according to claim 63, wherein said first program code determines that said GPS data is reliable if:

a GPS derived position is greater than a first distance from a previous position and within a second distance from said previous position; and a displacement heading and a GPS derived heading are both within a first heading threshold of a previous heading.

66. The processor readable storage medium according to claim 63, wherein:

said first program code uses a previous map matched position to determine if said GPS data is reliable.

67. The processor readable storage medium according to claim 63, wherein:

said second program code identifies a road on said electronic map, said object being located on or near said road.

68. An apparatus for tracking an object using an electronic map and GPS data, comprising:

a GPS receiver;

a processor in communication with said receiver;

a display in communication with said processor; and a storage medium in communication with said processor, said processor is programmed to perform a method comprising the steps of:

determining whether said GPS data is reliable, and matching said GPS data to an electronic map if said GPS data is determined to be reliable, said step of matching is performed without using data from navigation sensors other than one or more GPS sensors.

* * * * *